US006704268B2

(12) United States Patent
Kunimatsu

(10) Patent No.: US 6,704,268 B2
(45) Date of Patent: Mar. 9, 2004

(54) OPTICAL STORAGE DEVICE AND OPTICAL PICKUP UNIT HAVING TRACK CONTROL

(75) Inventor: Yasukiyo Kunimatsu, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 10/106,570

(22) Filed: Mar. 26, 2002

(65) Prior Publication Data

US 2002/0114258 A1 Aug. 22, 2002

Related U.S. Application Data

(63) Continuation of application No. PCT/JP99/06437, filed on Nov. 18, 1999.

(51) Int. Cl.[7] .................................................. G11B 7/09
(52) U.S. Cl. .................................. 369/112.24; 369/219
(58) Field of Search ........................... 369/112.24, 219

(56) References Cited

U.S. PATENT DOCUMENTS

| | | | | |
|---|---|---|---|---|
| 5,097,456 A | * | 3/1992 | Tanoshima et al. | 369/44.15 |
| 5,319,624 A | * | 6/1994 | Yamasaki et al. | 369/44.14 |
| 5,488,603 A | * | 1/1996 | Tomita et al. | 369/219 |
| 5,513,047 A | * | 4/1996 | Matsui | 358/824 |
| 5,581,533 A | * | 12/1996 | Fujisawa | 369/44.15 X |
| 5,663,840 A | * | 9/1997 | Matsui | 358/814 |
| 5,694,314 A | * | 12/1997 | Aoki et al. | 369/77.2 |
| 6,272,079 B1 | * | 8/2001 | Kanto et al. | 369/44.14 |
| 6,310,852 B1 | * | 10/2001 | Tomita et al. | 369/112.24 |

FOREIGN PATENT DOCUMENTS

| | | |
|---|---|---|
| EP | 89/04042 | 5/1989 |
| JP | 60-022743 | 2/1985 |
| JP | 01-317229 | 12/1989 |
| JP | 05-159336 | 6/1993 |
| JP | 05-225579 | 9/1993 |
| JP | 06-267107 | 9/1994 |
| JP | 08-190722 | 7/1996 |
| JP | 11-161980 | 6/1999 |

* cited by examiner

Primary Examiner—Aristotelis M Psitos
(74) Attorney, Agent, or Firm—Creer, Burns & Crain, Ltd.

(57) ABSTRACT

An optical storage device including a carriage movable in the radial direction of an optical storage medium, a light source, a first lens fixed to the carriage for focusing a light beam emitted from the light source onto the optical storage medium, a second lens interposed between the first lens and the light source, a beam splitter for reflecting at least a part of the light beam transmitted through the second lens in a direction perpendicular to the optical storage medium, and an actuator for supporting the second lens so that the second lens is movable in a given direction. The actuator includes an actuator base fixed to the carriage, a lens holder for holding the second lens so that the optical axis of the second lens extends in a direction substantially parallel to the optical storage medium, a supporting mechanism for movably supporting the lens holder to the actuator base, and a driving mechanism for moving the second lens in the above given direction.

12 Claims, 11 Drawing Sheets

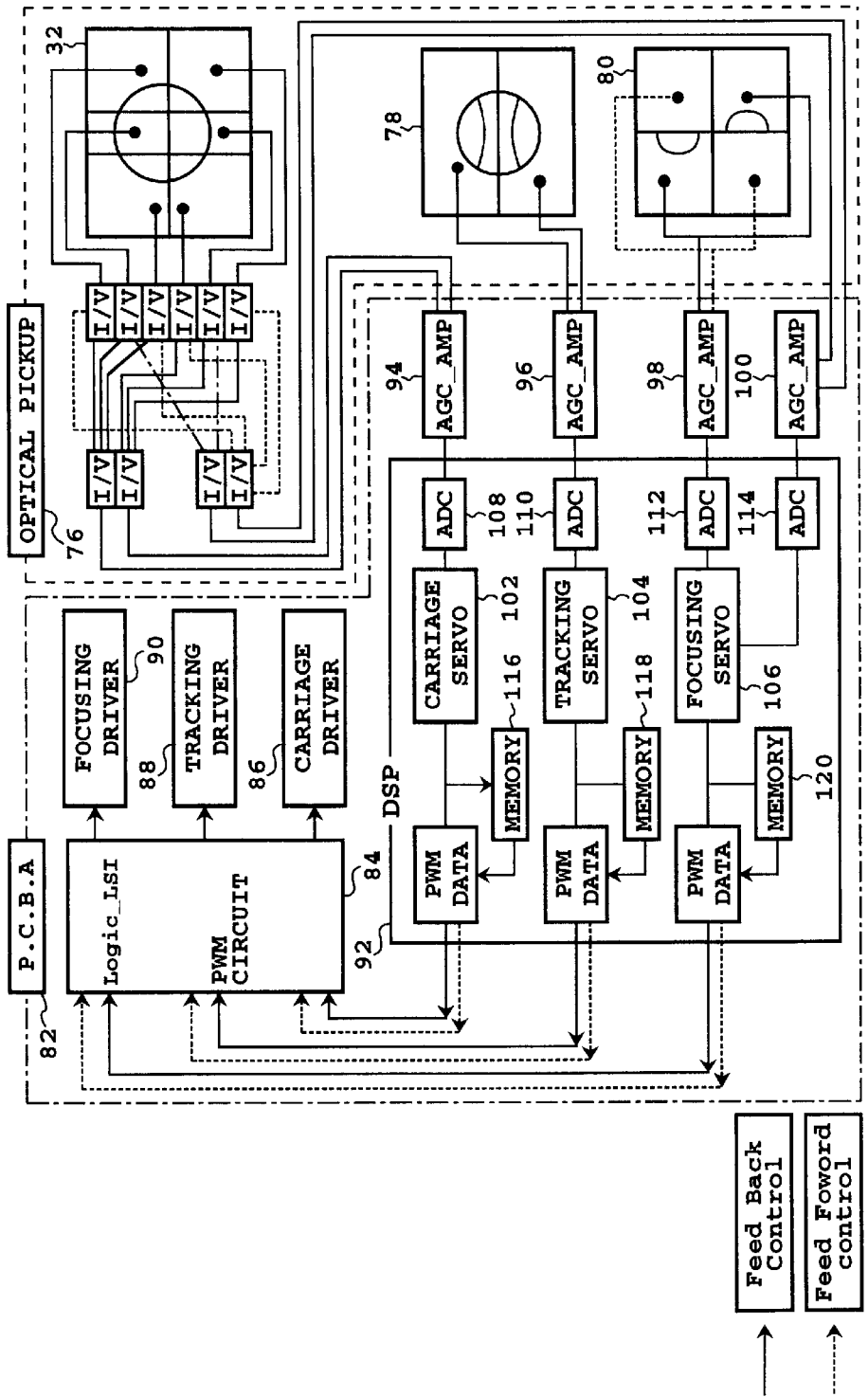

OPTICAL STORAGE DEVICE AND OPTICAL PICKUP UNIT HAVING TRACK CONTROL

This is a continuation of International PCT Application NO. PCT/JP99/06437 filed Nov. 18, 1999, which was not published in English.

BACKGROUND OF THE INVENTION

1. Field of the Invention

The present invention relates generally to an optical storage device, and more particularly to an optical pickup unit in an optical disk drive.

2. Description of the Related Art

An optical disk has received attention as a memory medium that becomes a core in the recent rapid development of multimedia, and it is usually accommodated in a cartridge case to be provided as an optical disk cartridge for practical use. The optical disk cartridge is loaded into an optical disk drive to perform reading/writing of data from/to the optical disk by means of an optical pickup (optical head).

A recent optical disk drive intended to realize size reduction is composed of a fixed optical assembly including a laser diode module, a beam splitter for reflecting and transmitting a laser beam, and a photodetector for receiving reflected light from an optical disk, and a movable optical assembly including a carriage and an actuator mounted on the carriage and having an objective lens. The carriage is movable in the radial direction of the optical disk along a pair of rails by means of a voice coil motor.

A write-power laser beam emitted from the laser diode of the fixed optical assembly is first collimated by a collimator lens, next transmitted by the beam splitter, next reflected by a beam raising mirror of the movable optical assembly, and finally focused on the optical disk by the objective lens, thereby writing data onto the optical disk. On the other hand, data reading is performed by directing a read-power laser beam onto the optical disk. Reflected light from the optical disk is first collimated by the objective lens, next reflected by the beam splitter, and finally detected by the photodetector, thereby converting the detected optical signal into an electrical signal.

The actuator includes an actuator base (fixed portion) fixed to the carriage, and a lens holder (movable portion) supported to the actuator base in a cantilever fashion by a plurality of spring wires or leaf springs. The lens holder has an objective lens, a focusing coil, and a plurality of tracking coils. A magnetic circuit opposed to the focusing coil and the tracking coils to configure a voice coil motor (VCM) is fixed to the actuator base or the carriage.

In the conventional optical disk drive, the light beam emitted from the light source in a direction substantially parallel to the recording surface of the optical disk is reflected in a direction perpendicular to the recording surface of the optical disk by the beam raising mirror, and next focused on the recording surface of the optical disk by the objective lens supported to the actuator. In this configuration, the objective lens is moved in a direction perpendicular to the recording surface of the optical disk by passing a current through the focusing coil, thereby performing a focusing operation.

Accordingly, the height of the optical pickup unit is equal to the sum of the height of the beam raising mirror and the height of the actuator. Actually, it is also necessary to ensure a movable range of the objective lens in the focusing direction. Accordingly, the height of the optical pickup unit can be reduced only by reducing the size of each component including the diameter of the light beam in the conventional optical disk drive. As a result, there is a limit to the reduction in thickness of the optical pickup unit.

In the conventional optical disk drive, the position of the actuator (the movable portion) is detected by using a two-segment photodetector or a four-segment photodetector to detect a part of the light beam emitted from the light emitting element mounted on the carriage and shielded by a light shielding portion provided on the movable portion of the actuator. Thus, the light emitting element and the photodetector must be mounted on the carriage to detect the position of the actuator in the tracking direction and the focusing direction in the conventional optical disk drive, causing an increase in size of the optical pickup unit. Furthermore, since the light shielding portion is required in the actuator, physical symmetry in the actuator is marred and it is therefore difficult to ensure good dynamic characteristics.

SUMMARY OF THE INVENTION

It is therefore an object of the present invention to provide an optical storage device which can realize a reduction in thickness of the optical pickup unit.

It is another object of the present invention to provide an optical storage device which can ensure physical symmetry in the optical pickup unit.

In accordance with an aspect of the present invention, there is provided an optical storage device capable of at least reading information recorded on an optical storage medium, including a drive base; a carriage mounted on the drive base so as to be reciprocatable in a first direction; first driving means for moving the carriage; a light source mounted on the drive base; a first lens fixed to the carriage for focusing a light beam emitted from the light source onto the optical storage medium; a second lens interposed between the first lens and the light source for focusing the light beam onto the optical storage medium in cooperation with the first lens; a beam splitter for reflecting at least a part of the light beam transmitted through the second lens in a direction perpendicular to the optical storage medium; and an actuator for supporting the second lens so that the second lens is movable in a given direction. The actuator includes an actuator base mounted on the carriage; a lens holder for holding the second lens so that the optical axis of the second lens extends in a direction substantially parallel to the optical storage medium; a supporting means for movably supporting the lens holder to the actuator base; and a second driving means for moving the second lens in the given direction. The second driving means includes a magnetic circuit fixed to the actuator base and a plurality of coils fixed to the lens holder.

The given direction includes the same direction as the first direction, and the second lens is moved in the first direction to thereby perform focusing of a beam spot formed on the optical storage medium in cooperation with the first lens. The given direction includes a rotational direction about an axis substantially perpendicular to the first direction and substantially parallel to the optical storage medium, and the second lens is rotated about the axis to thereby perform tracking of the beam spot formed on the optical storage medium.

Preferably, the optical storage device further includes a photodetector for detecting a light beam transmitted by the beam splitter. The photodetector may be a six-segment photodetector, and an output from each segment of the photodetector is differentially detected to thereby detect the position of the actuator in a focusing direction and a tracking direction.

According to the optical storage device of the present invention, the second lens supported by the actuator is moved in a direction substantially parallel to the optical storage medium to thereby perform the focusing operation, so that the thickness of the optical pickup unit can be reduced.

In accordance with another aspect of the present invention, there is provided an optical pickup unit capable of at least reading information recorded on an optical storage medium, including a light source; a carriage reciprocatable in a first given direction; a first lens fixed to the carriage for focusing a light beam emitted from the light source onto the optical storage medium; a second lens interposed between the first lens and the light source for focusing the light beam onto the optical storage medium in cooperation with the first lens; a beam splitter for reflecting at least a part of the light beam transmitted through the second lens in a direction perpendicular to the optical storage medium; and an actuator for supporting the second lens so that the second lens is movable in a second given direction. The actuator includes an actuator base mounted on the carriage; a lens holder for holding the second lens so that the optical axis of the second lens extends in a direction substantially parallel to the optical storage medium; a supporting means for movably supporting the lens holder to the actuator base; and a driving means for moving the second lens in the second given direction. The driving means includes a magnetic circuit fixed to the actuator base and a plurality of coils fixed to the lens holder.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 13 is a control block diagram in the preferred embodiment of the present invention.

DESCRIPTION OF THE PREFERRED EMBODIMENTS

Figure 1:
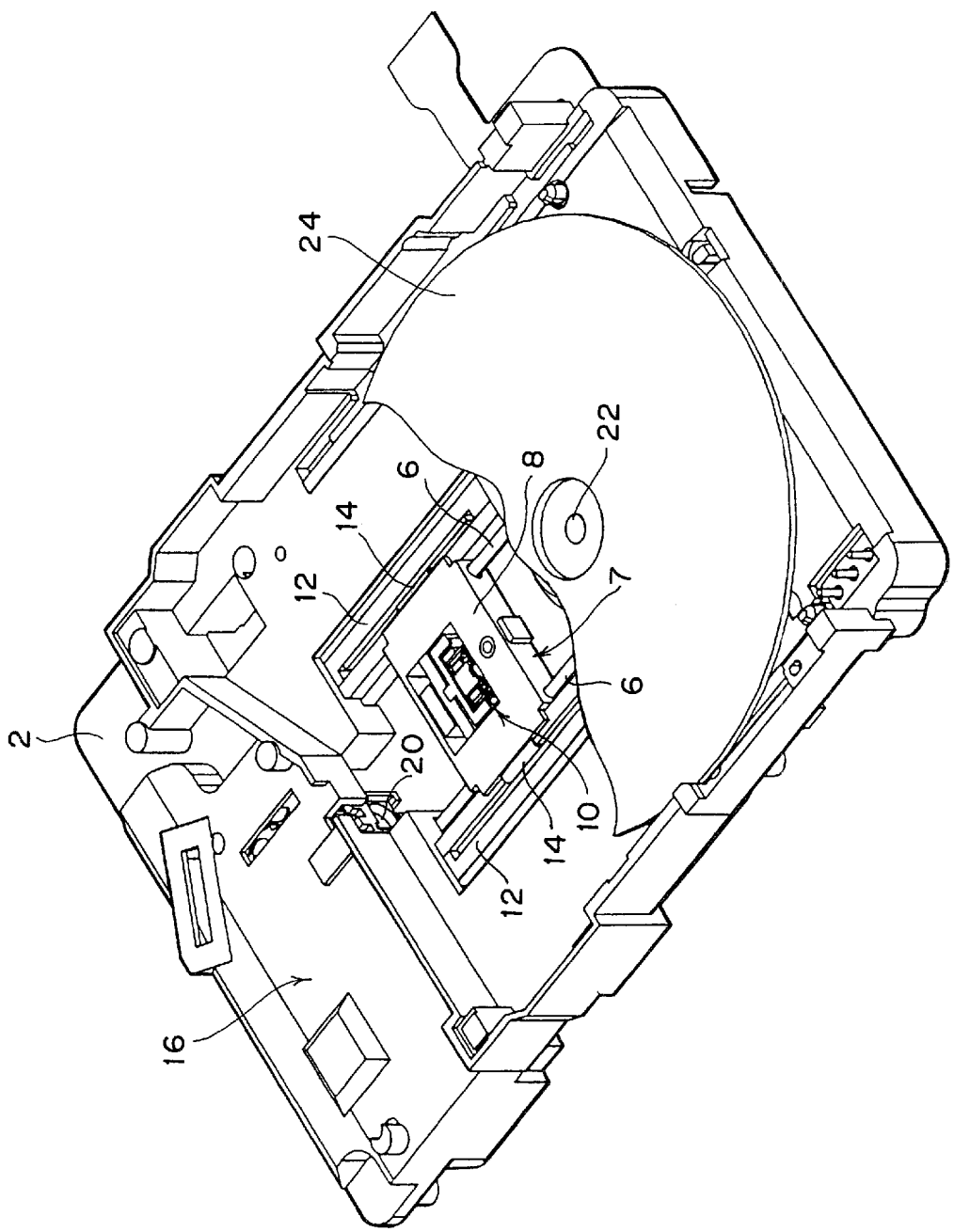
FIG. 1 is a perspective view of an optical disk drive according to a preferred embodiment of the present invention as viewed from the upper side thereof.
Figure 2:
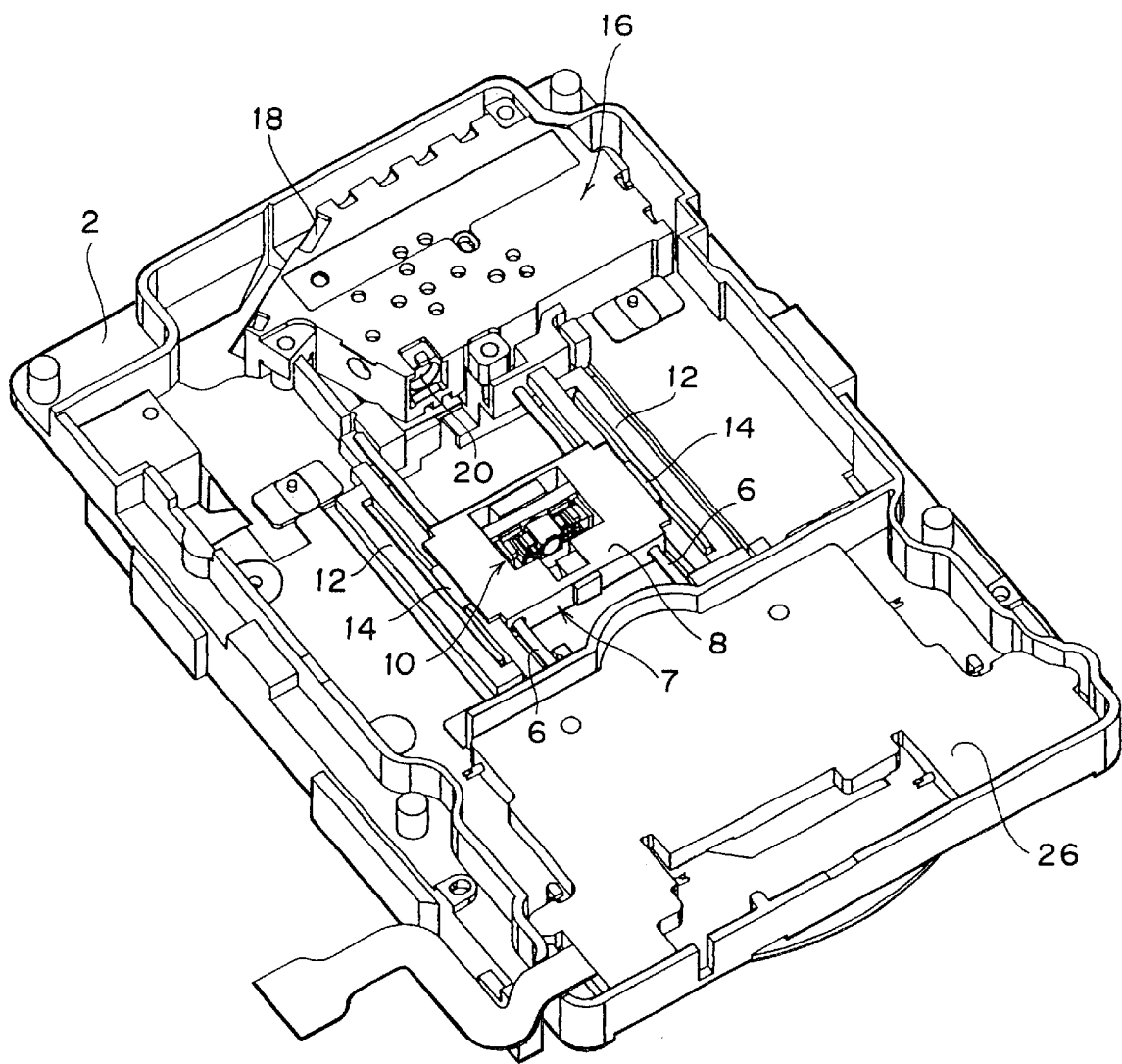
FIG. 2 is a perspective view of the optical disk drive as viewed from the lower side thereof.

Referring to FIGS. 1 and 2, there are shown perspective views of an optical disk drive as viewed from the upper and lower sides thereof according to a preferred embodiment of the present invention, respectively. Reference numeral 2 denotes a drive base of the optical disk drive. A spindle motor 22 is mounted on the drive base 2. As the configuration of the drive base 2 to which the present invention is applied, the configuration disclosed in U.S. Pat. No. 5,694,314 may be used. When an optical disk 24 is inserted into the optical disk drive, the spindle motor 22 is lifted to chuck the optical disk 24. A pair of guide rails 6 are fixed to the drive base 2. Reference numeral 7 generally denotes an optical pickup unit movable in the radial direction of the optical disk 24 as being guided by the guide rails 6. The optical pickup unit 7 includes a carriage 8 and an actuator 10 mounted on the carriage 8. The carriage 8 is formed of resin.

A pair of magnetic circuits 12 are mounted on the drive base 2 in parallel to the guide rails 6. A pair of coils 14 are mounted on the carriage 8. The magnetic circuits 12 and the coils 14 constitute a voice coil motor (VCM). By passing a current through the coils 14, the carriage 8 is moved in the radial direction of the optical disk 24 as being guided by the guide rails 6. As shown in FIG. 2, a fixed optical assembly 16 is mounted on the drive base 2.

Figure 3:
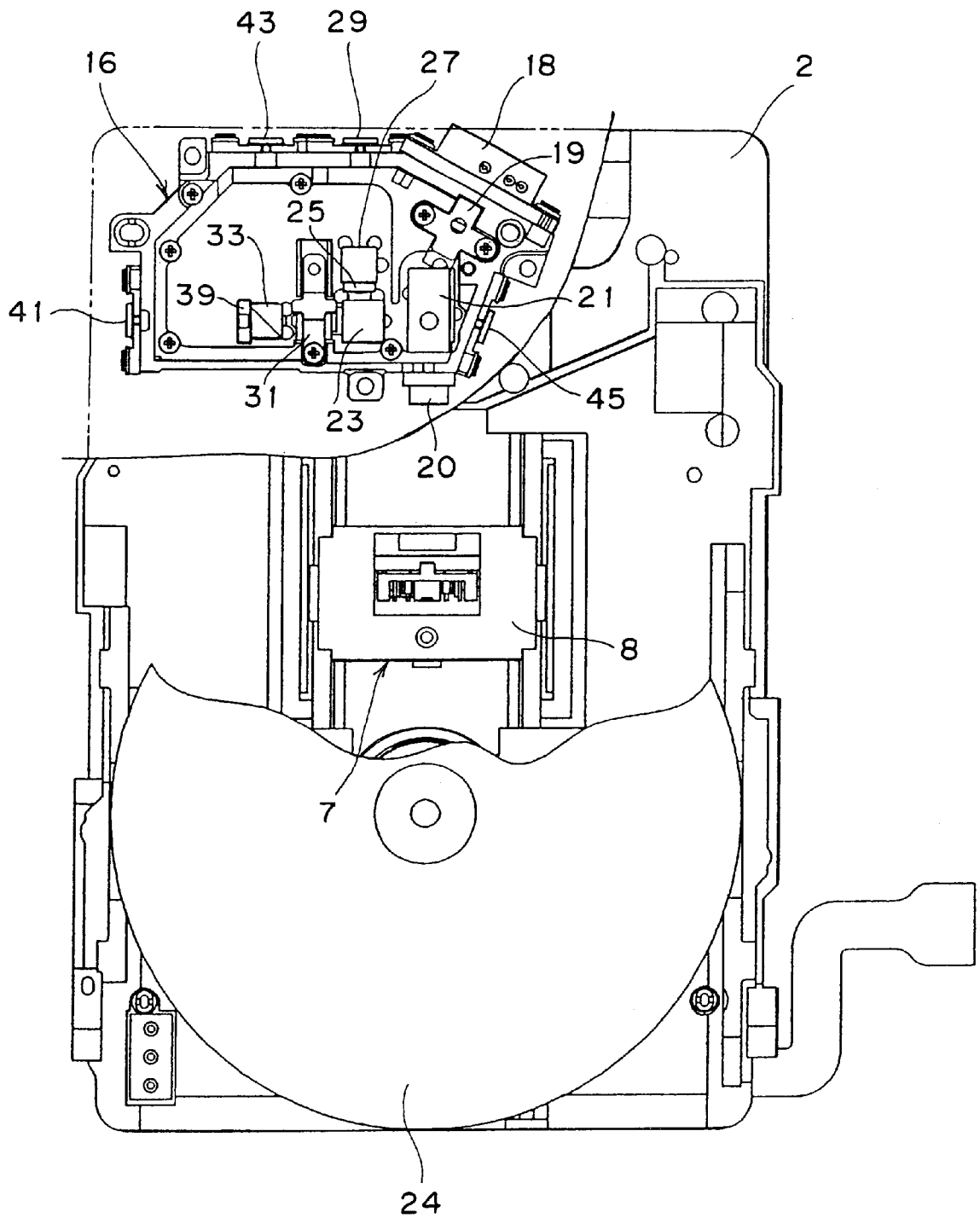
FIG. 3 is a partially cutaway, plan view of the optical disk drive, showing a fixed optical assembly.

Referring to FIG. 3, the fixed optical assembly 16 is shown in detail. The fixed optical assembly 16 is mounted on the lower surface of the drive base 2. A laser beam emitted from a laser diode (LD) 18 is collimated by a collimator lens 19, and next transmitted by a beam splitter 21 having a circularity correcting function. The transmitted light from the beam splitter 21 is directed through a window 20 to the optical pickup unit 7.

Reflected light from the optical disk 24 is reflected by the beam splitter 21 to enter a beam splitter 23. A part of the reflected light from the beam splitter 21 is reflected by the beam splitter 23, and the remaining reflected light is transmitted by the beam splitter 23. The reflected light from the beam splitter 23 is transmitted through a condenser lens 25 and a Wollaston prism 27, thereby being focused on an MO signal photodetector 29. On the other hand, the transmitted light from the beam splitter 23 is transmitted through a servo condenser lens 31 to enter a beam splitter 33. A part of the transmitted light from the condenser lens 31 is transmitted by the beam splitter 33, and the remaining transmitted light is reflected by the beam splitter 33. The transmitted light from the beam splitter 33 is transmitted through a Foucault prism 39, thereby being focused on a focus error signal photodetector 41. On the other hand, the reflected light from the beam splitter 33 is focused on a track error signal photodetector 43. Reference numeral 45 denotes an automatic power control (APC) photodetector. Reference numeral 26 shown in FIG. 2 denotes a spindle motor assembly having the spindle motor 22 for rotating the optical disk 24 and a mechanism for chucking the optical disk 24.

Figure 4:
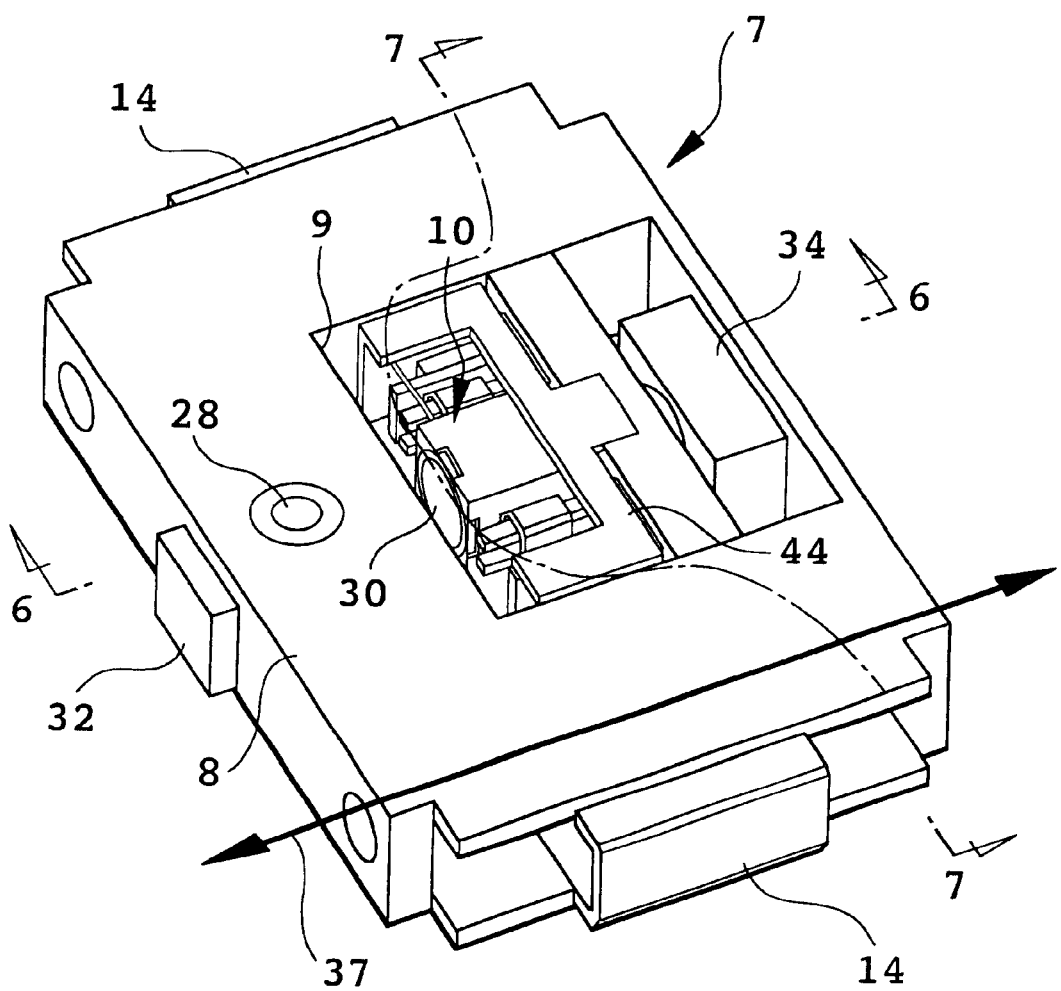
FIG. 4 is a perspective view of an optical pickup unit as viewed from the upper side thereof.
Figure 5:
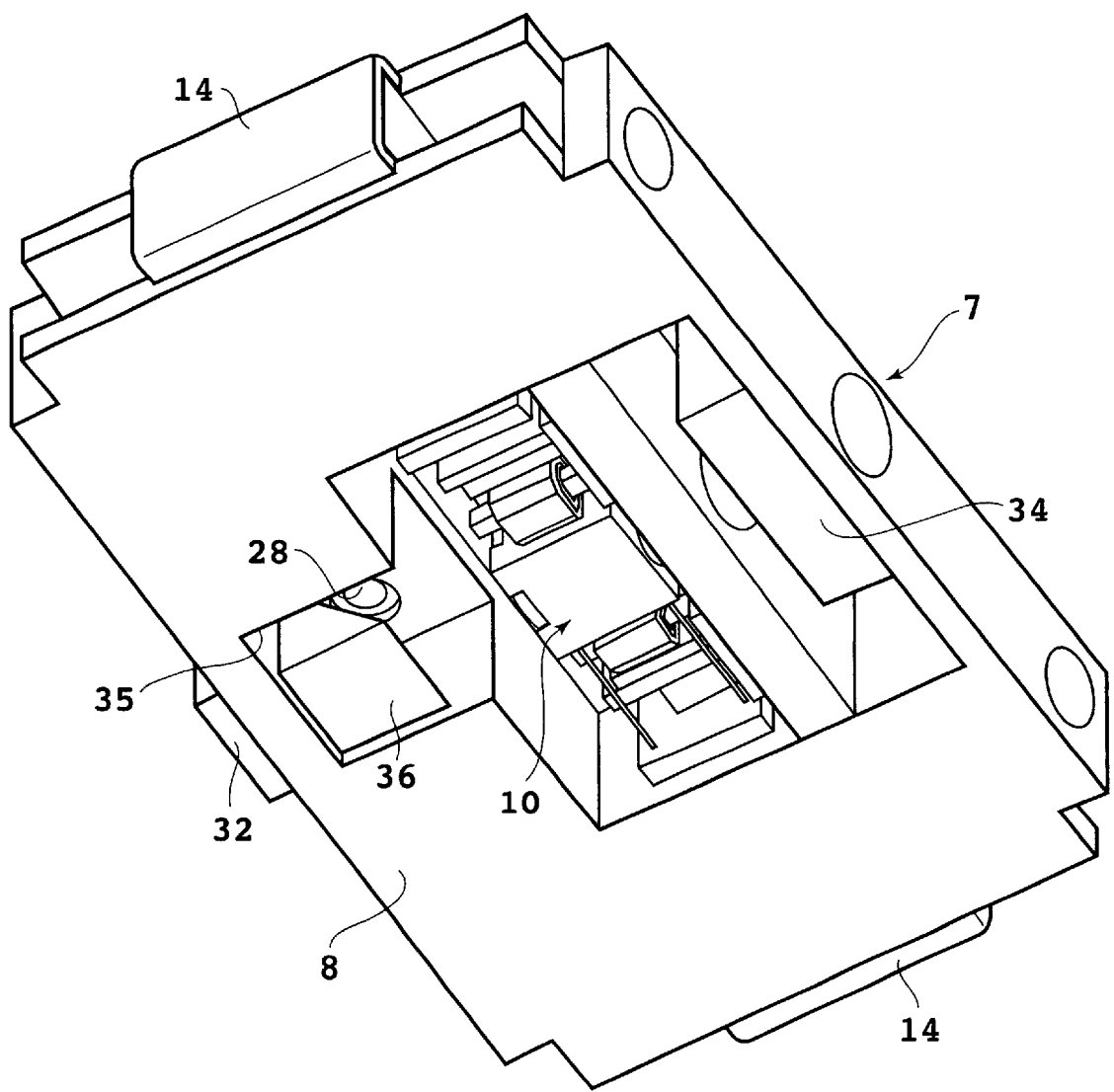
FIG. 5 is a perspective view of the optical pickup unit as viewed from the lower side thereof.

Referring to FIG. 4, there is shown a perspective view of the optical pickup unit 7 as viewed from the upper side thereof. FIG. 5 is a perspective view of the optical pickup unit 7 as viewed from the lower side thereof. The carriage 8 has a recess 9, and the actuator 10 is mounted in the recess 9. A first lens (objective lens) 28 and a six-segment photodetector 32 are fixed to the carriage 8. A second lens 30 is movably supported to the actuator 10. As shown in FIG. 5, the lower surface of the carriage 8 is recessed at 35 below the first lens 28, and a beam splitter 36 is mounted in the recess 35. A balance weight 34 is mounted on the carriage 8 so that the actuator 10 supporting the second lens 30 is mounted at a position substantially coinciding with the center of gravity of the optical pickup unit 7.

Figure 6:
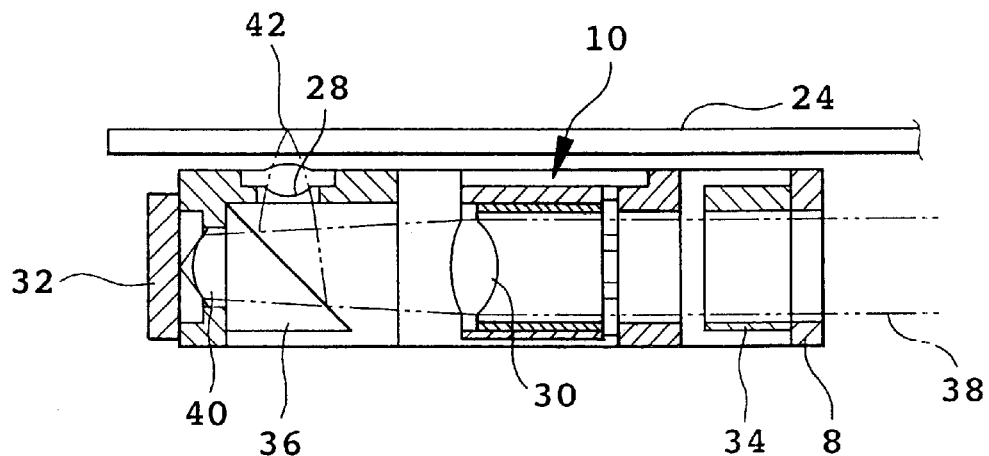
FIG. 6 is a cross section taken along the line 6—6 in FIG. 4.

Referring to FIG. 6, a light beam 38 emitted from the LD 18 (see FIG. 3) is transmitted through the second lens 30 having an optical axis substantially parallel to the recording surface of the optical disk 24 to enter the beam splitter 36. A coupler film of a dielectric multilayer is formed on the slant surface of the beam splitter 36. The reflection characteristic and the transmission characteristic of the beam splitter 36 to the light beam 38 are controlled according to the number of layers of the dielectric multilayer and the film thickness of the dielectric multilayer. For example, the beam splitter 36 reflects about 90% of the light beam 38 and transmits about 10% of the light beam 38. The light beam reflected by the beam splitter 36 is focused onto the recording surface of the optical disk 24 by the first lens (objective lens) 28 to form a beam spot 42 on the recording surface of the optical disk 24. On the other hand, the light beam transmitted by the beam splitter 36 is focused onto the six-segment photodetector 32 by a third lens 40.

Figure 7:
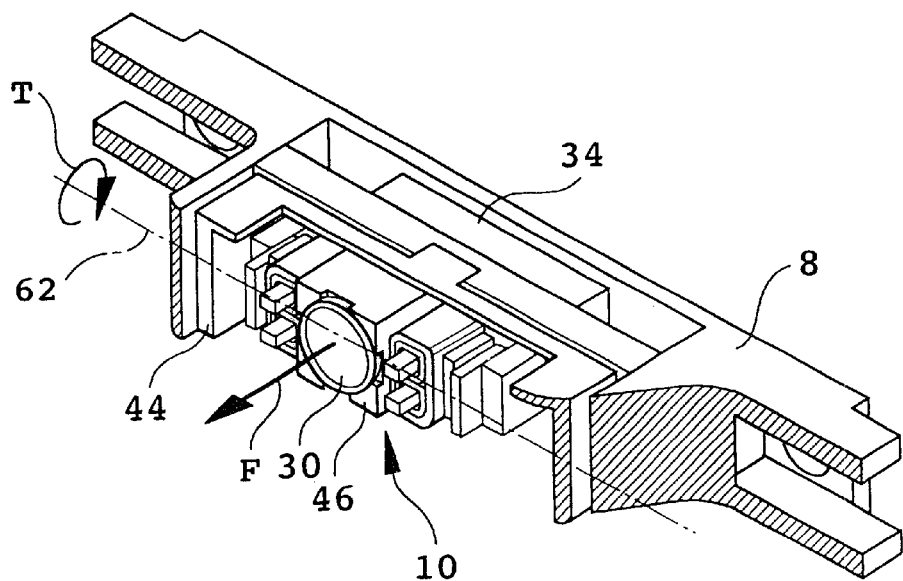
FIG. 7 is a cross section taken along the line 7—7 in FIG. 4.
Figure 8:
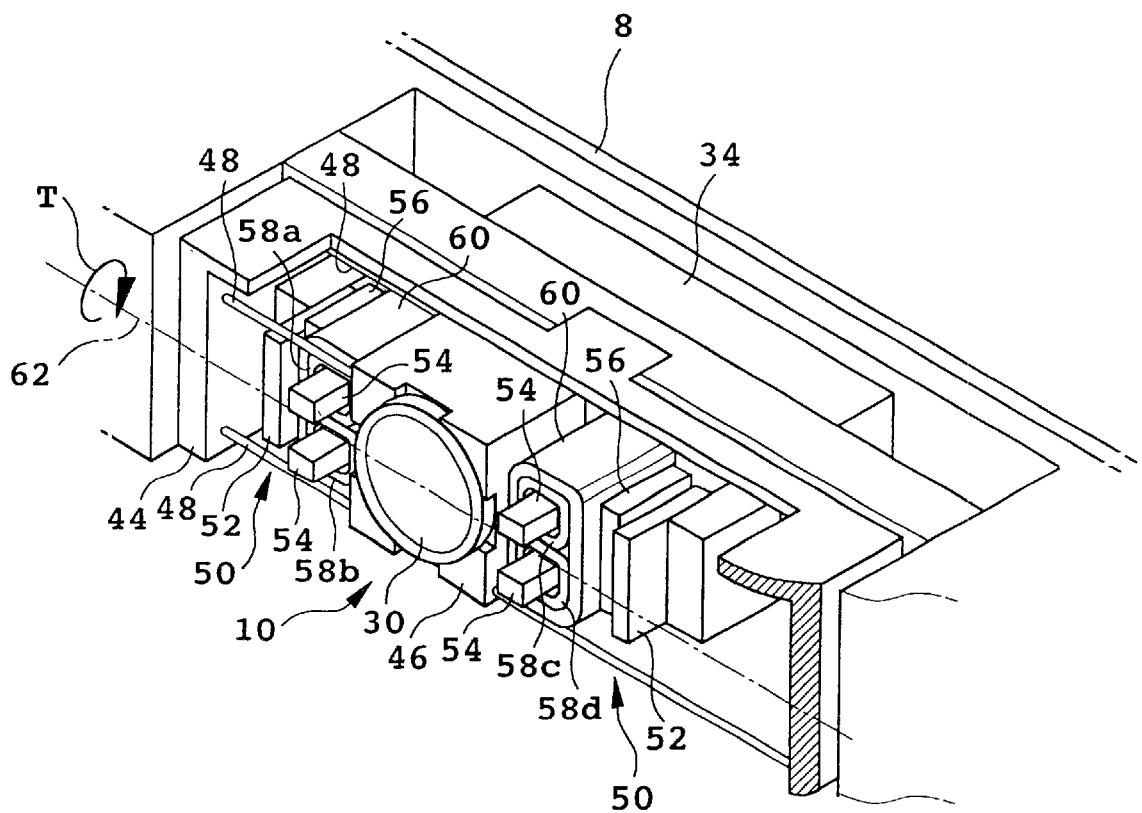
FIG. 8 is a partially cutaway, enlarged view of FIG. 7.

Referring to FIG. 7, there is shown a cross section taken along the line 7—7 in FIG. 4. FIG. 8 is a partially cutaway, enlarged view of FIG. 7. The actuator 10 includes an actuator base 44. The actuator base 44 is fixed to the carriage 8 at opposite side surfaces oriented in a direction perpendicular to the direction of movement of the carriage 8. The actuator 10 also includes a lens holder 46 for movably supporting the second lens 30. The lens holder 46 is supported to the actuator base 44 in a cantilever fashion by four wires 48 each having elasticity. More specifically, one end of each wire 48 is fixed to the actuator base 44, and the other end of each wire 48 is fixed to the lens holder 46. In this preferred embodiment, each wire 48 extends in a direction perpendicular to the direction of movement of the carriage 8, i.e., to the radial direction of the optical disk 24.

A pair of magnetic circuits 50 are provided on the opposite sides of the lens holder 46. Each magnetic circuit 50 includes an outer yoke 52, a pair of inner yokes 54, and a permanent magnet 56 bonded to the outer yoke 52. The outer yoke 52 and the inner yokes 54 of each magnetic circuit 50 extend in the direction of movement of the carriage 8. A pair of focusing coils 60 are bonded to the opposite side surfaces of the lens holder 46. A pair of tracking coils 58a and 58b are wound around the inner yokes 54 of the left magnetic circuit 50 as viewed in FIG. 8, and the outer surfaces of the tracking coils 58a and 58b are bonded to the inner surface of the left focusing coil 60 as viewed in FIG. 8. Similarly, a pair of tracking coils 58c and 58d are wound around the inner yokes 54 of the right magnetic circuit 50 as viewed in FIG. 8, and the outer surfaces of the tracking coils 58c and 58d are bonded to the inner surface of the right focusing coil 60 as viewed in FIG. 8. That is, the left focusing coil 60 is wound around the tracking coils 58a and 58b, and the right focusing coil 60 is wound around the tracking coils 58c and 58d. By passing a current through the focusing coils 60, the second lens 30 is moved in a direction of arrow F shown in FIG. 7 by a voice coil motor (VCM) configured by the focusing coils 60 and the magnetic circuits 50, thereby performing a focusing operation of the light beam onto the recording surface of the optical disk 24 in cooperation with the first lens 28 fixed to the carriage 8. By reversing the current passing through the focusing coils 60, the second lens 30 is moved in the reverse direction opposite to the direction F.

Further, by passing a current through the tracking coils 58a, 58b, 58c, and 58d, the second lens 30 is rotated about an axis 62 substantially perpendicular to the direction of movement of the carriage 8 and substantially parallel to the recording surface of the optical disk 24 by a voice coil motor (VCM) configured by the magnetic circuits 50 and the tracking coils 58a, 58b, 58c, and 58d, thereby performing a tracking operation of the beam spot 42 formed on the recording surface of the optical disk 24. More specifically, by passing a current having a first direction through the tracking coils 58a and 58c and passing a current having a second direction opposite to the first direction through the tracking coils 58b and 58d, the second lens 30 is rotated about the axis 62 in a direction of arrow T shown in FIG. 8. Conversely, by passing a current having the second direction through the tracking coils 58a and 58c and passing a current having the first direction through the tracking coils 58b and 58d, the second lens 30 is rotated about the axis 62 in the reverse direction opposite to the direction T.

Figure 9:
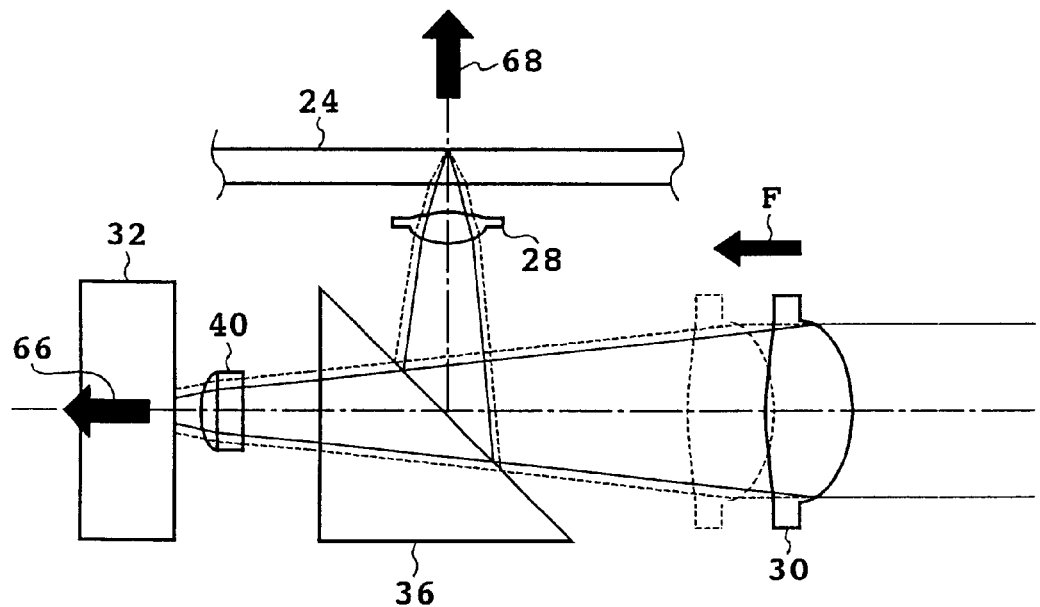
FIG. 9 is a schematic view for illustrating a focusing operation.

The focusing operation will now be described in more detail with reference to FIG. 9. When the second lens 30 is moved in the direction F, the focus of the beam spot formed on the recording surface of the optical disk 24 is moved in a direction of arrow 68, i.e., toward a far side with respect to the first lens 28. At this time, the focus of the beam spot formed on the photodetector 32 is also moved in a direction of arrow 66, i.e., toward a far side with respect to the third lens 40. Conversely, when the second lens 30 is moved in the reverse direction opposite to the direction F, the focus of the beam spot formed on the recording surface of the optical disk 24 is moved in the reverse direction opposite to the direction 66, i.e., toward a near side with respect to the first lens 28. Similarly, the focus of the beam spot formed on the photodetector 32 is moved in the reverse direction opposite to the direction 66, i.e., toward a near side with respect to the third lens 40.

Figure 10:
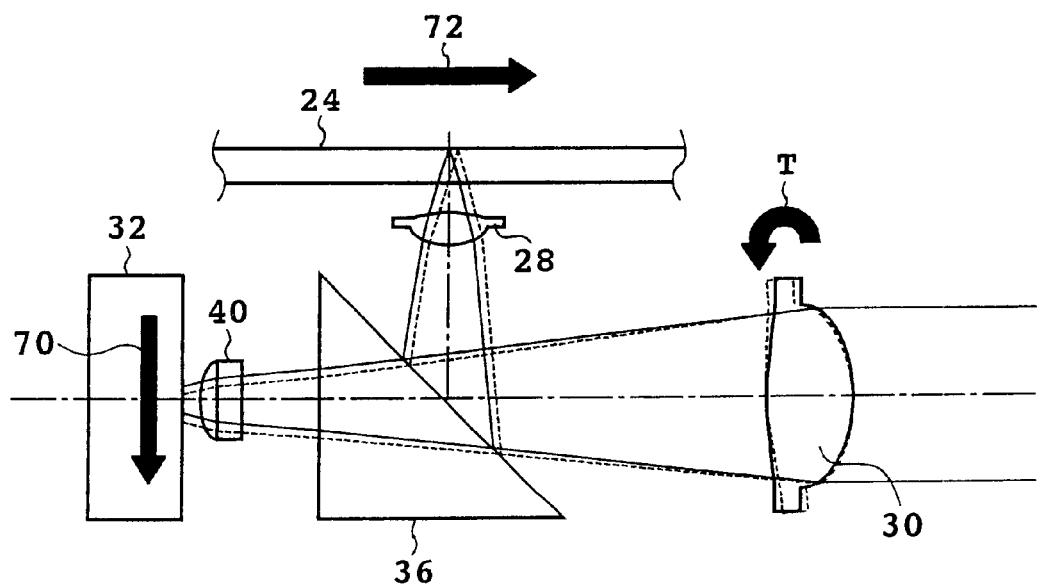
FIG. 10 is a schematic view for illustrating a tracking operation.

The tracking operation will now be described in more detail with reference to FIG. 10. When the second lens 30 is rotated in the direction T, i.e., counterclockwise as viewed in FIG. 10, the beam spot formed on the recording surface of the optical disk 24 is moved in a direction of arrow 72, i.e., in the radial direction of the optical disk 24. At this time, the beam spot formed on the photodetector 32 is moved in a direction of arrow 70. Conversely, when the second lens 30 is rotated in the reverse direction opposite to the direction T, i.e., clockwise as viewed in FIG. 10, the beam spot formed on the recording surface of the optical disk 24 is moved in the reverse direction opposite to the direction 72, and the beam spot formed on the photodetector 32 is moved in the reverse direction opposite to the direction 70. Thus, the tracking operation of the beam spot formed on the recording surface of the optical disk 24 is performed by rotating the second lens 30. Accordingly, the beam spot formed on the recording surface of the optical disk 24 can be largely moved by a slight rotation of the second lens 30.

Figure 11:
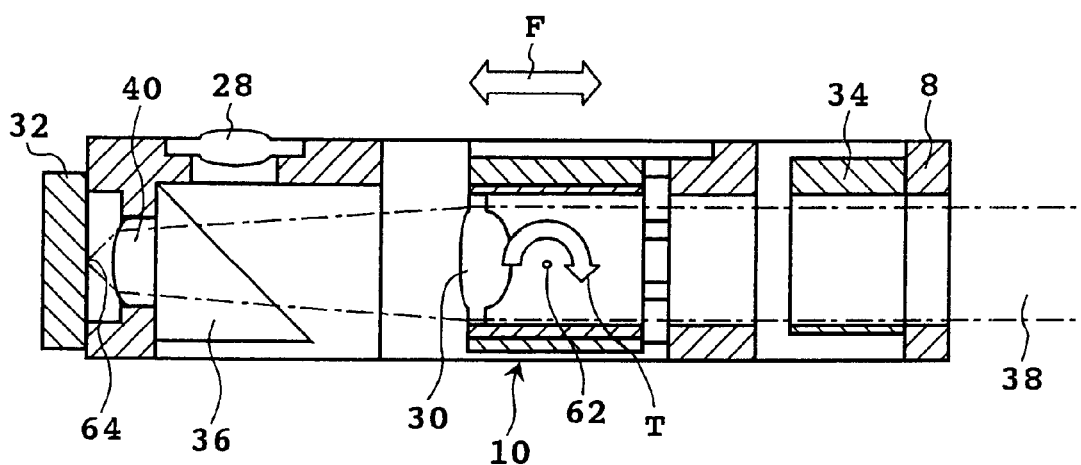
FIG. 11 is a sectional view similar to FIG. 6, illustrating an optical path for detection of the position of an actuator.

Referring to FIG. 11, there is shown a sectional view similar to FIG. 6, illustrating an optical path for detection of the position of the actuator 10. As mentioned above, focusing control is performed by moving the second lens 30 in the direction F or the opposite direction thereof, and tracking control is performed by rotating the second lens 30 in the direction T or the opposite direction thereof. The light beam 38 transmitted through the second lens 30 and next transmitted through the beam splitter 36 is focused on the six-segment photodetector 32 by the third lens 40 to form a beam spot 64 on the photodetector 32.

Figure 12B:
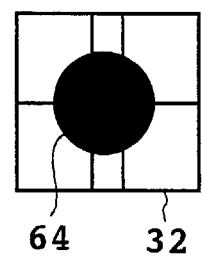
FIGS. 12A to 12E are schematic views showing changes in a beam spot formed on a photodetector.
Figure 12D:
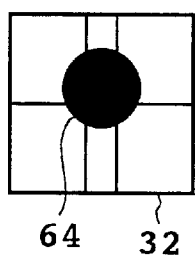
Figure 12A:
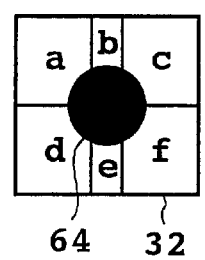

FIGS. 12A to 12E show changes in the beam spot 64 on the photodetector 32. FIG. 12A shows a condition where the focus of the beam spot 42 formed by the first lens (objective lens) 28 substantially lies on the recording surface of the optical disk 24 and that the beam spot 42 substantially lies on a given track of the optical disk 24.

The detection of the position of the actuator 10 (exactly, the second lens 30 supported to the actuator 10) in the focusing operation is performed by detecting a change in area of the beam spot 64 formed on the six-segment photodetector 32. That is, the following calculation is made.

$$\text{Focus } P = (b+e) - (a+c+d+f)$$

On the other hand, the detection of the position of the actuator 10 in the tracking operation is performed by detecting a change in position of the beam spot 64 formed on the six-segment photodetector 32. That is, the following calculation is made.

$$\text{Track } P = (a+b+c) - (d+e+f)$$

Figure 12E:
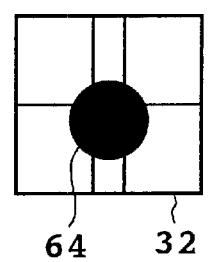
Figure 12C:
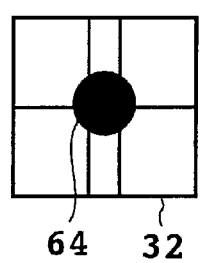

FIG. 12B shows a condition where the focus of the beam spot 42 formed on the recording surface of the optical disk 24 lies on the far side, and FIG. 12C shows a condition where the focus of the beam spot 42 lies on the near side. FIG. 12D shows a condition where the focus of the beam spot 42 lies on the recording surface of the optical disk 24 and that it is deviated from a target track toward the inner circumference of the optical disk 24. FIG. 12E shows a condition where the focus of the beam spot 42 lies on the recording surface of the optical disk 24 and that it is deviated from the target track toward the outer circumference of the optical disk 24.

It should be noted herein that the detection of the position of the beam spot 64 by the six-segment photodetector 32 is performed to detect the position of the actuator 10 in the focusing direction and the tracking direction and that servo control for detection of the position of the beam spot 42 formed on the recording surface of the optical disk 24 is performed according to a focusing error signal (FES) and a tracking error signal (TES) well known in the art by using other photodetectors.

Referring to FIG. 13, there is shown a control block diagram in the preferred embodiment of the present invention. Reference numeral 76 denotes an optical pickup including the lens position signal photodetector 32 mentioned above, a tracking error signal photodetector 78, and a focusing error signal photodetector 80. Reference numeral 82 denotes a printed circuit board assembly including a logic LSI 84, a carriage driver 86, a tracking driver 88, a focusing driver 90, a digital signal processor (DSP) 92, and automatic gain controller amplifiers (AGC AMP) 94, 96, 98, and 100. The DSP 92 includes a carriage servo 102, a tracking servo 104, a focusing servo 106, analog digital controllers (ADC) 108, 110, 112, and 114, and memories 116, 118, and 120.

In FIG. 13, the solid arrows indicate feedback control and the broken arrows indicate feedforward control. First, the logic LSI 84 controls the carriage driver 86 according to target track data stored in the memory 116, and the carriage driver 86 accordingly drives the VCM configured by the magnetic circuits 12 and the coils 14 to move the carriage 8 so that the beam spot 42 formed on the optical disk 24 comes to lie on the target track. This control is feedback control according to the data stored in the memory 116.

A tracking signal from the photodetector 32 is input through the AGC AMP 94 and the ADC 108 to the carriage servo 102 to feedback control the position of the carriage 8 so that the beam spot 42 comes to lie on the target track. Every time the target track changes, the corresponding data is read from the memory 116 to feedforward control the position of the carriage 8. Accordingly, the position of the carriage 8 is feedforward controlled and feedback controlled in combination.

A tracking error signal from the tracking error signal photodetector 78 is input through the AGC AMP 96 and the ADC 110 to the tracking servo 104 to feedback control the position of the beam spot 42 so that the beam spot 42 is always maintained on the target track. When the target track is changed, the corresponding data is read from the memory 118 to feedforward control the position of the beam spot 42. Accordingly, tracking of the beam spot 42 is feedback controlled and feedforward controlled in combination.

A focusing error signal (FES) from the FES photodetector 80 is input through the AGC AMP 98 and the ADC 112 to the focusing servo 106. The tracking signal from the photodetector 32 is also input through the AGC AMP 100 and the ADC 114 to the focusing servo 106. However, the tracking signal from the photodetector 32 is used only at starting the disk drive. During the operation of the disk drive, the focusing control of the beam spot 42 is performed by only the feedback control according to the FES from the FES photodetector 80. In this feedback control, a focusing signal from the photodetector 32 is blocked and not input into the focusing servo 106.

More specifically, at starting the disk drive the second lens 30 is moved to a given left position as viewed in FIG. 6. Thereafter, the second lens 30 is gradually moved rightward as viewed in FIG. 6 until the FES is detected. When the FES is detected, the position of the second lens 30 is obtained from the output from the photodetector 32, and the data on this position is stored into the memory 120. At restarting the disk drive, the second lens 30 is moved under the feedforward control according to the data stored in the memory 120.

While the laser diode 18 is mounted on the drive base 2 in the above preferred embodiment, the laser diode 18 may be mounted on the carriage 8. Further, the actuator base 44 may be formed integrally with the carriage 8. The present invention is not limited to an optical disk drive, but applicable to any drives adopting an optical card or an optical tape as a recording medium.

According to the present invention as described above, the focusing control of the light beam is performed by moving the second lens in a direction parallel to the optical storage medium, so that the height of the optical pickup unit becomes equal to the sum of the height of the beam raising mirror and the thickness of the first lens. That is, it is not necessary to consider the height of the actuator, thereby allowing a reduction in thickness of the optical pickup unit and accordingly allowing a reduction in thickness of the optical storage device. Assuming that the distance between the second lens 30 and the beam splitter 36 is 0.6 mm, for example, the rotational angle θ of the second lens 30 required for movement of the light beam by 0.2 mm in the tracking direction (radial direction of the disk) becomes 2 degrees because $0.2/0.6 = \sin\theta$. Thus, the light beam can be largely moved in the tracking direction by slightly rotating the second lens 30. Accordingly, the thickness of the carriage 8 for carrying the actuator 10 can be reduced.

Furthermore, the mechanism for focusing the light beam by moving the second lens 30 in parallel to the optical disk 24 is provided on the carriage 8. With this arrangement, it is possible to eliminate any effects due to variations in the distance between the laser diode 18 mounted on the drive base 2 and the second lens 30 mounted on the carriage 8 which variations are caused by the movement of the carriage 8. Accordingly, any components for eliminating the above effects can be reduced.

Further, the position of the actuator is detected by using a part of the light beam directed onto the optical storage medium. Accordingly, it is not necessary to provide any light shielding portion for shielding light from a light emitting element in the actuator as in the prior art, so that physical symmetry in the actuator and in the optical pickup unit can be ensured to thereby improve vibrational characteristics.

What is claimed is:

1. An optical storage device capable of at least reading information recorded on an optical storage medium, comprising:

a carriage reciprocatable in a first given direction;

a light source;

a first lens fixed to said carriage for focusing a light beam emitted from said light source onto said optical storage medium;

a second lens interposed between said first lens and said light source for focusing said light beam onto said optical storage medium in cooperation with said first lens;

a beam splitter for reflecting at least a part of said light beam transmitted through said second lens in a direction perpendicular to said optical storage medium; and an actuator for supporting said second lens so that said second lens is movable in a second given direction and a third given direction;

said actuator comprising:

an actuator base mounted on said carriage;

a lens holder for holding said second lens so that an optical axis of said second lens extends in a direction substantially parallel to said optical storage medium;

supporting means for movably supporting said lens holder to said actuator base; and driving means for moving said second lens in said second given direction, wherein said second given direction is the same as said first given direction, and said second lens is moveable in said second given direction to perform focusing of a beam spot formed on said optical storage medium in cooperation with said first lens, and wherein said third given direction is a rotational direction about an axis substantially perpendicular to said first given direction and substantially parallel to said optical storage medium, and said second lens is rotatable about said axis to perform tracking of a beam spot formed on said optical storage medium.

2. An optical storage device according to claim 1, further comprising a photodetector for detecting an operational condition of said actuator on said carriage.

3. An optical storage device according to claim 2, wherein said photodetector is mounted on said carriage so as to detect a light beam transmitted through said beam splitter.

4. An optical storage device according to claim 2, wherein said photodetector is a six-segment photodetector, and the position of said actuator in a focusing direction and a tracking direction is detected according to an output from said six-segment photodetector.

5. An optical storage device according to claim 2, further comprising a third lens interposed between said beam splitter and said photodetector.

6. An optical storage device according to claim 5, wherein said beam splitter and said third lens are fixed integrally to said carriage.

7. An optical storage device according to claim 1, wherein said supporting means comprises a plurality of wires each having one end fixed to said actuator base and the other end fixed to said lens holder.

8. An optical storage device according to claim 1, wherein focusing control is performed by moving said second lens horizontally, and tracking control is performed by rotating said second lens.

9. An optical storage device according to claim 1, wherein said first lens moves in a radial direction of the medium, and said second lens moves in another direction to perform focus control and tracking control of the medium respectively.

10. An optical storage device capable of at least reading information recorded on an optical storage medium, comprising:

a drive base;

a carriage mounted on said drive base so as to be reciprocatable in a first direction;

first driving means for moving said carriage;

a light source;

a first lens fixed to said carriage for focusing a light beam emitted from said light source onto said optical storage medium;

a second lens interposed between said first lens and said light source for focusing said light beam onto said optical storage medium in cooperation with said first lens;

a beam splitter for reflecting at least a part of said light beam transmitted through said second lens in a direction perpendicular to said optical storage medium; and an actuator for supporting said second lens so that said second lens is movable in a second direction and a third direction;

said actuator comprising;

an actuator base mounted on said carriage;

a lens holder for holding said second lens so that an optical axis of said second lens extends in a direction substantially parallel to said optical storage medium;

supporting means for movably supporting said lens holder to said actuator base; and second driving means for moving said second lens in said second direction, said second driving means including a magnetic circuit fixed to said actuator base and a plurality of coils fixed to said lens holder, wherein said second direction is the same as said first direction, and said second lens is moveable in said second direction to perform focusing of a beam spot formed on said optical storage medium in cooperation with said first lens, and wherein said third direction is a rotational direction about an axis substantially perpendicular to said first direction and substantially parallel to said optical storage medium, and said second lens is rotatable about said axis to perform tracking of a beam spot formed on said optical storage medium.

11. An optical pickup unit capable of at least reading information recorded on an optical storage medium, comprising:

a light source;

a carriage reciprocatable in a first given direction;

a first lens fixed to said carriage for focusing a light beam emitted from said light source onto said optical storage medium;

a second lens interposed between said first lens and said light source for focusing said light beam onto said optical storage medium in cooperation with said first lens;

a beam splitter for reflecting at least a part of said light beam transmitted through said second lens in a direction perpendicular to said optical storage medium; and an actuator for supporting said second lens so that said second lens is movable in a second given direction and a third given direction;

said actuator comprising:
  an actuator base mounted on said carriage;
  a lens holder for holding said second lens so that an optical axis of said second lens extends in a direction substantially parallel to said optical storage medium;
  supporting means for movably supporting said lens holder to said actuator base; and
  driving means for moving said second lens in said second given direction, said driving means including a magnetic circuit fixed to said to said actuator base and a plurality of coils fixed to said lens holders,
  wherein said second given direction is the same as said first given direction, and said second lens is moveable in said second given direction to perform focusing of a beam spot formed on said optical storage medium in cooperation with said first lens, and
  wherein said third given direction is a rotational direction about an axis substantially perpendicular to said first given direction and substantially parallel to said optical storage medium, and said second lens is rotatable about said axis to perform tracking of a beam spot formed on said optical storage medium.

12. An optical pickup unit according to claim 11, further comprising a photodetector for detecting a light beam transmitted through said beam splitter.

* * * * *